UNITED STATES PATENT OFFICE.

FRITZ POLLAK, OF VIENNA, AUSTRIA.

DISTILLING PROCESS.

1,422,475.      Specification of Letters Patent.      Patented July 11, 1922.

No Drawing.      Application filed May 1, 1920. Serial No. 378,244.

*To all whom it may concern:*

Be it known that I, FRITZ POLLAK, a citizen of the Czecho-Slovak Republic, and residing at Vienna, Austria, have invented certain new and useful Improvements in a Distilling Process (for which I have filed an application in Austria Nov. 8, 1918, and in Germany Jan. 21, 1919), of which the following is a specification.

This invention relates to the art of distilling volatile substances, and in particular a volatile liquid wherein volatile substances are dissolved, and it has for its purpose so to modify certain steps of the process as to afford possibility for obtaining a distillate any part of which contains the original constituents in the same ratio.

According to the usual method of distilling, the heat required for the liquid under treatment is supplied by heating the outer shell of the vessel or by heating devices introduced into the liquid, in such a manner that heating of the substance to be distilled far beyond its vaporizing temperature is avoided. At difference with this process, the material under treatment is, according to the process forming the subject-matter of the invention, heated in very small particles to such a high temperature that every particle is vaporized by an explosion-like action. The escaping vapors are collected and condensed in the usual way. When distilling a mixture of volatile matters, the temperature to which the material under treatment is to be heated, must be higher than the vaporizing temperature of the least volatile constituent. For carrying the process into practice, one may, for instance cause the mixture to fall in drops upon a surface heated beyond vaporizing temperature of the least volatile constituent. Thereat the liquid forms spherical bodies suspended over a portion of vapor and vaporizing with explosion-like rapidity. In consequence of this rapid, simultaneous vaporization of all constituents of the mixture, the distillate contains in all its portions the components of the mixture under treatment in the same ratio as they originally therein existed. Even differences of 100° C. between the vaporizing points of the constituents do not play in this case any considerable part. Consequently, the problem occasionally presenting itself to the chemist, thus to distill a mixture of volatile substances, for instance a liquid wherein volatile substances are dissolved, that each portion of the distillate contains the same components, no matter the vaporizing points of the single components of the mixture, may be solved in a simple manner. The escaping vapors may be fractioned by gradual refrigeration.

Such fractional condensation is well known to the art, and my invention has nothing to do with the specific operating conditions of this step of the process.

It depends on the nature of the liquid to be heated and on the purpose of the distillation to what temperature above the vaporizing temperature of the substance to be distilled or of the least volatile component of a mixture, the heating surface is to be brought. For the distillation of bodies whose vaporizing point lies considerably below 250° C., a metal vessel is in general used, which is at most heated to dark red-heat. With bodies whose vaporizing point is nearer to 400° C. and whose inflammation temperature is high, one heats to advantage to bright red-heat. When a metal alloy is to be distilled, one is in most cases obliged to use yet higher temperatures. For reasons of economy, it is advantageous exactly to adjust, beforehand, the temperature of the heated surface in each special case. Instead of applying the substance to be distilled to suitably heated surfaces, it may also be in small portions introduced into hollow spaces of suitable temperature. The heating surface or the sides of the heated hollow spaces may be formed of suitable minerals, metal oxids or metals salts. Divers materials suit this purpose, for instance noble metals, copper, iron, asbestos, graphite, silica, silicates, magnesia, clay etc. The choice of the material depends on the conditions under which working is carried on.

The supply of heat may be effected by electric resistance heating or by other sources of calorie, such as gas, coke or coal furnaces. The distillation act may take place at the ordinary pressure of air, or at reduced or increased pressure. In order to further the act, it is advantageous in many cases to blow or to suck through the apparatus a weak current of air, steam or gas.

The peculiarity of the process permits to obtain technical results, which hitherto could not be obtained at all. Thus, it was not possible hitherto to distill the aqueous formaldehyde solution of the trade, which contains methyl alcohol. As is well known, methyl alcohol is oxydized by passing it over red hot metals. Thereupon, a part of the vapor of methyl alcohol always escapes its burning to formaldehyde. Such solutions contain furthermore dissolved gaseous formaldehyde, formaldehyde-hydrates, polyoxymethylenes, etc. When such a mixture is heated in the manner hitherto in use, first distills over a mixture of methyl alcohol, formaldehyde and steam; thereafter ensues a weak aqueous solution of formaldehyde whose boiling point is near to 99° to 102° C. The residue consists of polymeric formaldehyde which, after the complete volatilization of the solvent, forms a white amorpheous powder. This product does not melt on being further heated but it sublimes a little below 150° C., when it decomposes to gaseous formaldehyde. The gaseous formaldehyde repolymerizes however immediately on cooling. The nature of the sublimate is not always uniform but depends on the conditions of condensation. Anyhow, there can be no question of a regular suitability for distillation of the original mixture. For this reason, one was obliged to start from paraformaldehyde for obtaining aqueous solutions of formaldehyde free from methly alcohol. The paraformaldehyde was gasified and the repolymerization of the gas was prevented by blowing it, with the aid of a nitrogen current, into a refrigerated receiver, in which it was either liquified at a temperature of —20° C., or caught in water. As thereat continuous cloggings of the pipes took place, because at any sensibly cooler point, repolymerized paraformaldehyd precipitated, this process is also absolutely unfit for the techanical production of solutions of formaldehyde free of methly alcohol. On the contrary, when aqueous solutions of formaldehyde of this kind are caused to fall in small drops upon surfaces, which are heated beyond the vaporization temperature of the least volatile of the polymeric formaldehydes contained in the mixture, for instance of the paraformaldehyde, and when the evolved vapors are collected for condensation, a simultaneous vaporization of all volatile constituents of the mixture is attained.

However, when the vapors are too rapidly cooled, it may arrive that a weak solution of formaldehyde is collected by the receiver, while at the same time a smoke-like vapor escapes uncondensed. It seems that this fact is to be ascribed to the formation of crystalline polyoxmethylenes, which are little soluble in water. This drawback may certainly be avoided by very slowly cooling down the vapors passing away for condensation to a temperature of about 70° C., and by only from this temperature downward as far as the normal temperature, permitting the refrigeration to act in the normal rapid way.

In carrying the process into practice, a condensed liquid free of methyl alcohol may be immediately obtained by delivering the escaping vapors from the methyl alcohol through oxydation, before their condensation. This can be done, for instance, by causing the vapors to pass over an incandescent copper spiral.

What I claim is:

1. The described distilling process which consists in heating a mixture of substances to be distilled in small portions to a suitable temperature to vaporize all constituents of different vaporization points rapidly and simultaneously, and collecting and condensing the escaping vapors containing in each portion the components of the mixture under treatment in the same ratio as they originally therein existed.

2. The described distilling process which consists in heating a mixture of substances of different vaporization points to be distilled to a temperature higher than the vaporization point of the least volatile constituent to vaporize all constituents of the mixture rapidly and simultaneously and in collecting and condensing the escaping vapors contained in each portion the components of the mixture under treatment in the same ratio as they originally therein existed.

3. The described distilling process which consists in heating a volatile liquid wherein volatile substances are dissolved in small portions to a temperature exceeding the vaporization point of the least volatile constituent and in then condensing the escaping vapors whereby a distillate is obtained, each portion of which contains the same components, no matter what vaporization points the individual constituents of the mixture under treatment may have.

4. The described distilling process which consists in heating a mixture of substances of different vaporization points to be distilled to a temperature higher than the vaporization point of the least volatile constituent to vaporize all constituents of the mixture rapidly and simultaneously, and in fractionally condensing the escaping vapors by gradual refrigeration.

5. The described distilling process which consists in causing a mixture of substances of different vaporization points to be distilled to be applied in very small particles to surfaces which are heated to a temperature higher than the vaporization point of the least volatile constituent of the mixture, and in condensing the escaping vapors to obtain a distillate containing in each portion the components of the mixture under treatment in the same ratio as they originally therein existed.

6. The described process of distilling aqueous solutions of formaldehyde, containing formaldehyde-hydrates, polymers of the formaldehyde and methyl alcohol, the said process consisting in causing the solution to drop in small particles upon surfaces heated beyond the vaporization temperature of the least volatile of the polymeric formaldehydes, and in collecting and condensing the escaping vapors.

7. The described process of distilling aqueous solutions of formaldehyde, containing formaldehyde-hydrates, polymers of the formaldehyde and methyl alcohol, the said process consisting in causing the solution to drop in very small particles upon surfaces heated beyond the vaporization temperature of the least volatile of the polymeric formaldehydes, in collecting the escaping vapors and—for the purpose of condensation—in first cooling them very slowly down to 70° C., and afterwards refrigerating them in the usual manner.

8. The described process of distilling aqueous solutions of formaldehyde, containing formaldehyde-hydrates, polymers of the formaldehyde and methyl alcohol, the said process consisting in causing the solution to drop in very small particles upon surfaces heated beyond the vaporization temperature of the least volatile of the polymeric formaldehydes, in freeing the escaping vapors from the methyl alcohol by oxidation and in finally condensing them.

9. The described process of distilling aqueous solutions of formaldehyde, containing formaldehyde-hydrates, polymers of the formaldehyde and methyl alcohol, the said process consisting in causing the solution to drop in very small particles upon surfaces heated beyond the vaporization temperature of the least volatile polymeric formaldehydes, leading the escaping vapors over an incandescent copper spiral, and finally condensing them.

10. The described process of distilling aqueous solutions of formaldehyde, containing formaldehyde hydrates, polymers of the formaldehyde, and methyl alcohol, the said process consisting in causing the solution in small particles to drop upon surfaces heated beyond the vaporizing temperature of the least volatile of the polymeric formaldehydes, leading the escaping vapors over an incandescent copper spiral, and in finally—for the purpose of condensation—first cooling the vapors very slowly down to 70° C. and afterwards refrigerating them in the usual way.

In testimony whereof I have affixed my signature.

FRITZ POLLAK.